United States Patent [19]

Stefanou

[11] 4,120,563
[45] Oct. 17, 1978

[54] REFLECTING AND MAGNIFYING VIEWING APPARATUS

[76] Inventor: John Stefanou, 31 Meadow St., East Orange, N.J. 07017

[21] Appl. No.: 756,887

[22] Filed: Jan. 5, 1977

[51] Int. Cl.² .................................................. G02B 27/00
[52] U.S. Cl. .................................... 350/235; 362/138
[58] Field of Search ........ 362/135, 138, 139, 142–144; 128/22, 23; 350/235–237, 81

[56] References Cited

U.S. PATENT DOCUMENTS 3,556,086  1/1971  Gordon ................................. 128/22

FOREIGN PATENT DOCUMENTS 203,784  9/1923  United Kingdom ..................... 350/81

Primary Examiner—F. L. Evans

[57] ABSTRACT

Reflecting and magnifying viewing apparatus is disclosed comprising a first and second tube intersecting one another at an angle, the tubes being rotatable with respect to one another through a coupling. A reflecting surface is pivotally positioned in the second tube and a light source is positioned in the first tube for directing light out of the opening of the second tube for illuminating an object to be viewed through a magnifying lens in the open end of the first tube.

6 Claims, 3 Drawing Figures

U.S. Patent   Oct. 17, 1978   4,120,563
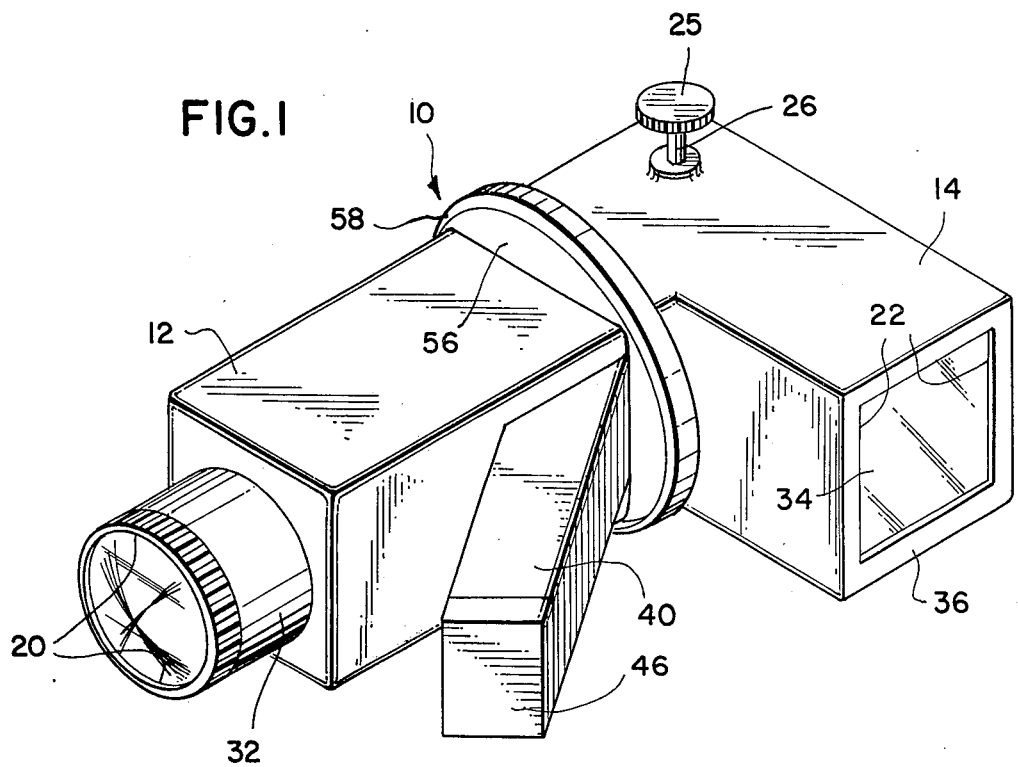
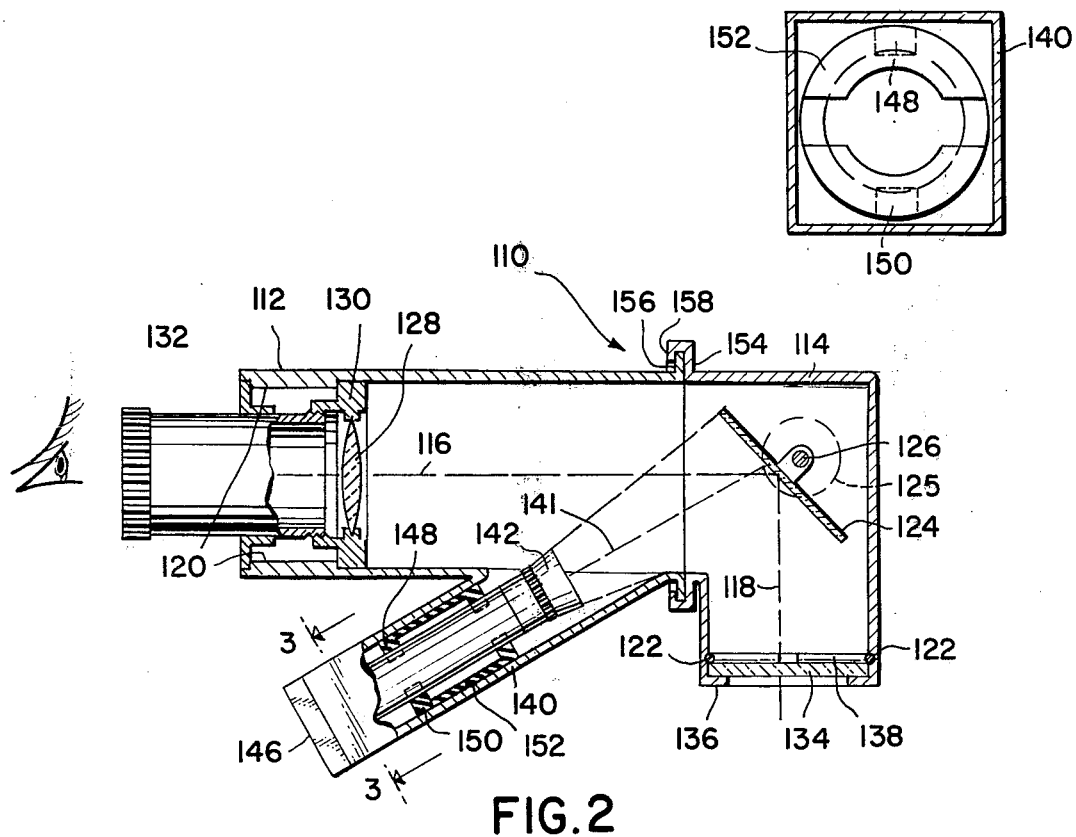

REFLECTING AND MAGNIFYING VIEWING APPARATUS

SUMMARY OF THE INVENTION

The present invention relates to reflecting and magnifying viewing apparatus comprising a first tube member and a second tube member joined to one another through a connecting member. The first tube has an open end and the second tube has an open end. The longitudinal axis of the first tube and the longitudinal axis of the second tube intersect one another at an angle less than 180°. A reflecting member is positioned in the second tube, the reflecting member being mounted on a pivot member. The rotational axis of the pivot member is parallel to the surface of the reflecting member and intersects the longitudinal axis of the second tube substantially in a transverse manner. An illuminating member is provided in the first tube, the illuminating member being positioned to reflect on the reflecting member. A magnifying member is positioned in at least one of the open ends of the tubes.

The connecting member may comprise a device to allow the first tube to rotate with respect to the second tube so that the longitudinal axis of the first tube and the longitudinal axis of the second tube intersect with one another.

The connecting member may comprise a first collar coupling member extending around the periphery of the first tube, the connecting member also comprising a second collar coupling member extending around the periphery and the longitudinal axis of the second tube. A sealing member is provided for rotatingly sealing the outer edge of the first collar coupling member to the outer edge of the second collar coupling member.

An adjusting member extends through the second tube and operatively engages the reflecting member for rotating the reflecting member on the pivot member.

The illuminating member may comprise a light source positioned in a third tube intersecting the first tube, the longitudinal axis of the third tube intersecting the longitudinal axis of the first tube at an angle less than 90°, the longitudinal axis of the third tube also intersecting the arc in which the reflecting member swings about the pivot member. The reflecting member may comprise a flat planar surface.

The third tube may be adapted to hold a hand-held battery powered flashlight. The magnifying member may comprise an optical lens in one of the open ends of the tubes.

BRIEF DESCRIPTION OF THE SEVERAL VIEWS OF THE DRAWING

FIG. 1 comprises a perspective view of the reflecting and magnifying viewing apparatus according to one embodiment of the present invention;

FIG. 2 comprises a side elevation partially in section of reflecting and magnifying viewing apparatus according to another embodiment of the present invention; and FIG. 3 comprises a plan view in section taken along the line 3—3 of FIG. 2.

DETAILED DESCRIPTION

Reflecting and viewing apparatus is disclosed in the prior art U.S. Pat. Nos. to Callaghan 3,247,757; Jones 3,171,883; Ray, et. al., 2,930,130; Copeland 2,883,908; Sutter 2,881,656; Ohlhaver 2,876,674; Brown 2,809,452; and Fiala 2,054,697.

It is an object of the present invention to provide novel reflecting and magnifying viewing apparatus in which a light source is positioned in the apparatus and in which the light source can be projected onto an object to be viewed where the objective and the viewing end of the apparatus are at an angle to one another.

It is a further object of the present invention to provide a reflecting and magnifying viewing apparatus of the aforesaid desiderata and in which the reflecting member is rotatable with respect to the objective end of the viewing apparatus about an axis transverse to the longitudinal axis of the objective end of the apparatus so that the field of view of the apparatus may be changed without moving the apparatus relative to a viewed object.

These and other objects have been achieved according to the present invention which will become apparent by reference to the disclosure and claims that follow as well as the appended drawing.

Referring to the drawing and FIGS. 1–3 therein, reflecting and magnifying viewing apparatus 10 and 110 are illustrated in which the apparatus 10 is a counterpart to the apparatus 110 however employs square tubes intersecting one another whereas the apparatus 110 employs rounded tubes intersecting one another.

Referring specifically to FIGS. 2 and 3 and the apparatus 110, a first tube 112 is provided having a longitudinal axis 116, the first tube 112 intersecting a second tube 114 having a longitudinal axis 118. The longitudinal axis 116 and the longitudinal axis 118 intersect one another at an angle less than 180° and in the illustration given in FIG. 2, these axes intersect one another at an angle of 90°. The first tube 112 has an opening 120 therein at one end and the second tube 114 has an opening 122 therein so that a viewing path is provided along the longitudinal axes 116 and 118. A reflecting surface such as a flat planar mirror 124 is mounted on a pivot member comprising an axle 126 secured to the tube 118, the axle 126 being parallel to the surface of the mirror or reflecting surface 124 and also being substantially transverse to the axis 116 and axis 118. A third tube 140 is positioned in the first tube, the longitudinal axis 141 of the third tube intersecting the arc through which the mirror 124 swings about the axle 126. The third tube 140 has a light source 142 such as a hand-held flashlight mounted therein, the light source 142 being secured into tube 140 by means of resilient support members 148 and 150 mounted on a ring 152 that extends around the inner periphery of tube 140. Tube 140 is sealed at one end by means of a cap 146. The tube 114 rotates with respect to the longitudinal axis 116 of tube 112 through a first coupling collar 154 and a second coupling collar 156 extending around the outer periphery of the tubes 112 and 114. The periphery of collar 154 extends in a flange 158 to form a rotatable light seal with respect to collar 156. A knob 125 (illustrated in phantom configuration) is provided on the axle 126 to rotate the mirror 124 about the axle 126, knob 125 extending beyond the outer wall of the tube 114.

The open end 120 has a visor 132 mounted therein, the visor 132 extending into a lens mount 130 in which a magnifying lens 128 is mounted. The open end 122 of tube 114 has a glass member 134 mounted therein abutting against a flange 136, the glass member 134 being held in place by means of a retaining ring 138.

The reflecting and magnifying viewing apparatus 10 is constructed along the same lines and principles as the reflecting and magnifying viewing apparatus 110; however, square tubes 12, 14, and 40 with cap 46 are provided which function in the same manner as tubes 112, 114 and 140.

Similarly, the tube 12 has an open end 20 and a visor 32, an adjusting screw 25 for turning an axle 26 to which a mirror (not illustrated) is mounted in tube 14. An opening 22 is provided at one end of tube 14, a glass member 34 being positioned at such opening 22 and being held in place by means of a flange 36 and a retaining ring on the opposite side thereof (not illustrated). Collar 56 is engaged by a collar having a flange 58 for rotating tube 14 with respect to tube 12.

In use, the apparatus 110 is employed to view objects which are small in size and which are difficult to see because of a lack of light. The light source 142 is turned on and the light emitting therefrom reflects off of the mirror 124 to illuminate an object that lies in the path of the longitudinal axis 118. This object in turn is reflected back into the mirror 124 and at an angle and along the longitudinal axis 116 through the magnifying lens 128 after which it is capable of being viewed through the eye of a person. The mirror 124 may be rotated to change the field of a view of the apparatus and tube 114 may be rotated with regard to bue 112 to change such field of view without moving the tube 112.

Although the invention has been described by reference to some embodiments, it is not intended that the novel reflecting and magnifying viewing apparatus be limited thereby but that modifications thereof are intended to be included as falling within the broad spirit and scope of the foregoing disclosure, the following claims and the appended drawing.

What is claimed is:

1. Reflecting and magnifying viewing apparatus comprising first tube means and second tube means joined to one another through a first coupling means extending around said first tube means, a second coupling means extending around said second tube, sealing means for rotatingly sealing said first coupling means to said second coupling means, both of said coupling means allowing for rotating said first tube means with respect to said second tube means and for preventing the leakage of light into said first tube means and said second tube means both of said coupling means being open towards the center thereof to allow the passage of light through said first tube means and said second tube means, said first tube means having an open end and said second tube means having an open end, the longitudinal axis of said first tube means and the longitudinal axis of said second tube means intersecting one another at an angle less than 180°, reflecting means positioned in said second tube means, said reflecting means being mounted on pivot means, the rotational axis of said pivot means being parallel to the surface of said reflecting means and being intersected by the longitudinal axis of said second tube means, substantially in a transverse manner, illuminating means in said first tube means, said illuminating means being positioned to reflect on said reflecting means, magnifying means positioned in at least one of said open ends of said tubes.

2. The apparatus of claim 1 further comprising adjusting means extending through said second tube and operatively engaging said reflecting means for rotating said reflecting means on said pivot means.

3. The apparatus of claim 1 where said illuminating means comprises a light source positioned in a third tube, said third tube intersecting said first tube, the longitudinal axis of said third tube intersecting the longitudinal axis of said first tube at an angle less than 90°, the longitudinal axis of said third tube also intersecting the arc in which said reflecting means swings about said pivot means.

4. The apparatus of claim 1 where said reflecting means comprises a flat planar surface.

5. The apparatus of claim 3 where said third tube is adapted to hold a hand-held battery powered flashlight.

6. The apparatus of claim 1 where said magnifying means comprises an optical lens.

* * * * *